US012752437B2

(12) United States Patent
Bosboom et al.

(10) Patent No.: US 12,752,437 B2
(45) Date of Patent: Oct. 6, 2026

(54) APPARATUS, SYSTEM AND METHOD FOR A VARIABLE SWATH END EFFECTOR

(71) Applicant: JABIL INC., St. Petersburg, FL (US)

(72) Inventors: Jeroen Bosboom, St. Petersburg, FL (US); Gunnar Haugen, St. Petersburg, FL (US); Bethany Weber, St. Petersburg, FL (US); Richard Munro, St. Petersburg, FL (US); Michael Mckenney, St. Petersburg, FL (US); Kwok Kuen Yu, St. Petersburg, FL (US); Babak Naderi, St. Petersburg, FL (US)

(73) Assignee: JABIL INC.

( * ) Notice: Subject to any disclaimer, the term of this patent is extended or adjusted under 35 U.S.C. 154(b) by 990 days.

(21) Appl. No.: 17/926,109

(22) PCT Filed: May 19, 2021

(86) PCT No.: PCT/US2021/033057
§ 371 (c)(1),
(2) Date: Nov. 17, 2022

(87) PCT Pub. No.: WO2021/236707
PCT Pub. Date: Nov. 25, 2021

(65) Prior Publication Data

US 2023/0191627 A1 Jun. 22, 2023

Related U.S. Application Data

(60) Provisional application No. 63/027,037, filed on May 19, 2020.

(51) Int. Cl.
*B25J 15/02* (2006.01)
*B25J 15/00* (2006.01)
*B25J 15/06* (2006.01)

(52) U.S. Cl.
CPC ....... *B25J 15/0286* (2013.01); *B25J 15/0014* (2013.01); *B25J 15/0683* (2013.01)

(58) Field of Classification Search
CPC . B25J 15/0014; B25J 15/0683; G11C 7/1006; H04N 19/91; H10P 72/7602; A01D 46/253
See application file for complete search history.

(56) References Cited

U.S. PATENT DOCUMENTS 6,224,123 B1 5/2001 Ubele et al.
10,357,883 B1 * 7/2019 O'Connor ............ B25J 15/0616

(Continued)

FOREIGN PATENT DOCUMENTS

CN 104875212 9/2015
CN 104875212 A 9/2015

(Continued)

OTHER PUBLICATIONS

English translation of ES 2733057 (Year: 2019).*

(Continued)

*Primary Examiner* — Gene O Crawford
*Assistant Examiner* — Sydney Jeanine Simmons
(74) *Attorney, Agent, or Firm* — Riverside Law LLP

(57) ABSTRACT

An apparatus, system and method for providing a variable swath end effector. The variable swath end effector may include: two arms, each for retaining a portion of a retained element; two pairs of bearing rails, each pair being uniquely mechanically associated with a one of the two arms, wherein a level of one pair of bearing rails is staggered from a second level of the other pair of earing rails in a perpendicular axis, and wherein the staggered pairs of bearing rails are interleaved with each other; and a motor capable of driving a belt in mechanical association with each of the two arms, wherein actuation of the motor drives the belt to synchro- (Continued)

nously move each of the two arms across a respective one of the pairs of bearing rails to vary the swath between the two arms.

19 Claims, 6 Drawing Sheets

(56) References Cited

U.S. PATENT DOCUMENTS

| | | | | |
|---|---|---|---|---|
| 10,381,257 | B2 * | 8/2019 | Tang | H10P 72/7602 |
| 2008/0181757 | A1 | 7/2008 | Wheeler | |
| 2017/0102993 | A1 * | 4/2017 | Hu | G11C 7/1006 |
| 2019/0283244 | A1 * | 9/2019 | Bonora | B25J 5/02 |
| 2019/0387678 | A1 * | 12/2019 | Knopf | A01D 46/253 |

FOREIGN PATENT DOCUMENTS

| | | | | |
|---|---|---|---|---|
| CN | 106426249 | | 2/2017 | |
| CN | 106426249 | A | 2/2017 | |
| CN | 108582135 | | 9/2018 | |
| CN | 108582135 | A | 9/2018 | |
| CN | 110581097 | | 12/2019 | |
| CN | 110581097 | A | 12/2019 | |
| EP | 0022331 | | 1/1981 | |
| EP | 0022331 | A1 | 1/1981 | |
| ES | 2733057 | T3 * | 11/2019 | H04N 19/91 |
| JP | 07132481 | A | 5/1995 | |
| JP | 2000079590 | | 3/2000 | |
| JP | 2000079590 | A | 3/2000 | |
| JP | 2007203402 | | 8/2007 | |
| JP | 2007203402 | A | 8/2007 | |
| JP | 2019010691 | | 1/2019 | |
| JP | 2019010691 | A | 1/2019 | |
| KR | 1020180100281 | A | 9/2018 | |
| WO | 2008094342 | | 8/2008 | |
| WO | 2008094342 | A2 | 8/2008 | |

OTHER PUBLICATIONS

Extended European Search Report issued in App. No. EP21808390, dated May 18, 2024, 9 pages.
Chinese Office Action issued in App. No. CN202180037557 dated Jun. 25, 2025 (pp. 1-7).
International Search Report and Written Opinion mailed on Aug. 27, 27, 2021 in International Application No. PCT/US2021/033057.
Written Opinion of the International Searching Authority mailed Aug. 26, 2021 in International Application No. PCT/US2021/033057.

* cited by examiner

APPARATUS, SYSTEM AND METHOD FOR A VARIABLE SWATH END EFFECTOR

CROSS-REFERENCE TO RELATED APPLICATION

This application claims the benefit of International Application PCT/US2021/033057, filed May 19, 2021, which claims the benefit of priority to U.S. Application No. 63/027,037, filed May 19, 2020, entitled APPARATUS, SYSTEM AND METHOD FOR A VARIABLE SWATH END EFFECTOR, the entirety of which is incorporated herein by reference as is set forth in its entirety.

BACKGROUND

Field of the Disclosure

The disclosure is directed to a pick and place end effector and, more particularly, to an apparatus, system and method for providing a variable swath effector module.

Description of the Background

The use of robotics is well established as a manufacturing expedient, particularly in applications where human handling is inefficient and/or ineffective-such as during semiconductor wafer processing. Current practice is to robotically handle substrate elements, such as wafers or films, using end effectors having arms for holding the elements, wherein the end effector is connected to a driving robot that is part of one processing cell which performs one process in a line of processes.

These automation work cells, such as semiconductor-process automation cells, are becoming more versatile, and thus must handle a larger variety of substrate elements. These end effectors may thus be challenged to fit into very small cassettes, while also stably transporting very larger wafers. Inevitably, expense causes compromise and trade-offs to be made to fulfill these often disparate goals, particularly as the sizes of the retained elements, such as semiconductor wafers, change.

Known solutions to this need for variable distances between end effector arms to service substrates of various sizes and weights generally involve exchanging different sizes of arms and/or variable-width arms (or varying the tooling between the arms). Of course, in order to switch out arms or tooling, the end effector, and thus the functionality provided by the end effector in its work cell, must be stopped. Accordingly, the work cell of which that end effector is a part must be stopped. This stoppage must extend for a timeframe commensurate with the time needed to switch out the arm and/or the effector tooling. Needless to say, such a stoppage of workflow is not only inconvenient, it is costly to the processing line, and thus increases the cost of the output product(s).

Thus, the need exists for an improved end effector capable of adjusting to provide a varying handling width.

SUMMARY

Certain embodiments are and include an apparatus, system and method for providing a variable swath end effector. The variable swath end effector may include: two arms, each for retaining a portion of a retained element; two pairs of bearing rails, each pair being uniquely mechanically associated with a one of the two arms, wherein a level of one pair of bearing rails is staggered from a second level of the other pair of earing rails in a perpendicular axis, and wherein the staggered pairs of bearing rails are interleaved with each other; and a motor capable of driving a belt in mechanical association with each of the two arms, wherein actuation of the motor drives the belt to synchronously move each of the two arms across a respective one of the pairs of bearing rails to vary the swath between the two arms.

Thus, the disclosure provides at least an improved apparatus, system and method for an improved end effector capable of adjusting to provide a varying handling width.

BRIEF DESCRIPTION OF THE DRAWINGS

The exemplary compositions, systems, and methods shall be described hereinafter with reference to the attached drawings, which are given as non-limiting examples only, in which.

DETAILED DESCRIPTION

Figure 1:
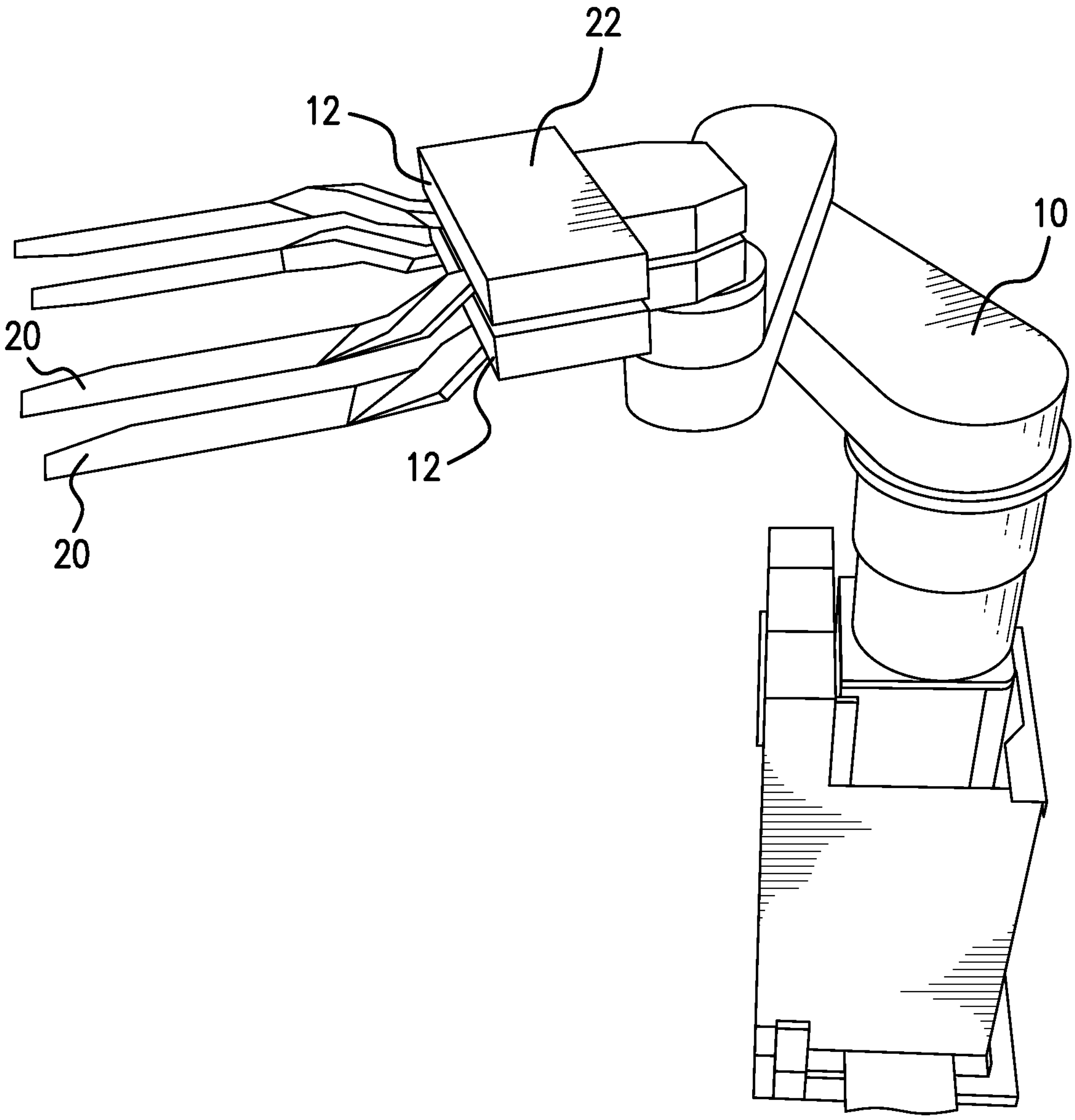
FIG. 1 is an illustration of an end effector.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the disclosed embodiments should not be construed to limit the scope of the disclosure. As referenced above, in some embodiments, well-known processes, well-known device structures, and well-known technologies may not be described in detail.

The disclosure solves the problem of handling, with a single end effector, both very small wafers, such as in the 50-75 mm size range, and larger wafers, such as in the 200-300 mm size range. More particularly, the disclosed variable swath end effector may handle wafers in a size range of 50-300 mm, and film frames of up to 330 mm. The embodiments provide this functionality using variable width adjusting arms.

When an element or layer is referred to as being "on", "upon", "connected to" or "coupled to" another element or layer, it may be directly on, upon, connected or coupled to the other element or layer, or intervening elements or layers may be present, unless clearly indicated otherwise. In contrast, when an element or layer is referred to as being "directly on," "directly upon", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Thus, terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

The disclosure solves the problem of handling, with a single end effector, both very small wafers, such as in the 50-75 mm size range, and larger wafers, such as in the 200-300 mm size range. More particularly, the disclosed variable swath end effector may handle wafers in a size range of 50 mm to 300 mm, and film frames of up to 330 mm. The embodiments provide this functionality using variable width adjusting arms.

Specifically, the variable width between the adjusting arms is provided in the embodiments in a small (relative to the adjustable distance) main housing package. For example, the disclosed end effector may provide 190 mm or more of available arm stroke in only 240 mm of main housing width. This variation in swath may be provided using configurable modular arms that are removable and replaceable.

In order to provide maximum arm stroke in a minimum-sized housing, the disclosure utilizes two pairs of stacked and interleaved linear bearing rails mounted separately in the main housing. The stacking and interleaved movement of the arm-bases reduces the overall width of the main housing by allowing the bearing carriages to pass each other, preferably one atop the other, and thus less width is required in the main housing to accommodate the moving arm bases.

In the embodiments, one of the bearing rail pairs may be fixed to the main housing, and the other bearing rail is offset from the first and may be mounted on a support plate structure. The support plate structure additionally may be adjustable in the pitch axis of the end effector. This adjustability enables the wafer arms, which may be extensive in distal length from the housing, to be leveled with respect to each other. The pitch adjustment may be composed of a pair of ramp and instrument screws, which may make leveling possible at even a micro-level.

For movement of the arms, the embodiments may use a motor, such as a stepper or a servo motor, by way of example. Motor position feedback, such as using a linear sliding resistance scale, may send an output, such as an analog output, to the controller, such as the 4 axis micro controller, in the end effector base block. Due to the high reliability of the motor position feedback, such as due to the consistent resistance reading of a linear sliding resistance scale, for any position along the arm travel path, the control input may act as an absolute position encoder.

Component selection in the disclosed embodiments may be keyed to a small form factor, a light weight, and high wear-resistance. By using such components, a very small and inexpensive stepper motor may be used in the embodiments. This, of course, may save on weight and space.

The variable-width dual arm configuration disclosed may be used as a narrow paddle, such as when the arms are brought together and pitch is adjusted for coplanarity, or as a variable-width fork end effector. The disclosed embodiments may include internal services for fiber optic cabling for tip mapping of retained wafers, and/or an air channel for suppling vacuum to arm-associated vacuum cups. The arms may be readily detachable at the proximal ends thereof, and may thus include interfaces (such as ports) with the aforementioned fiber optic and/or air/vacuum junctions.

The advantage of the disclosed embodiments is that a wide range of retained elements, such as wafers or substrates, can be handled with no tooling change overs, and thus without the drawbacks that typically come with the tooling or arm change overs in the prior art. That is, the disclosed variable arm-width end effector reduces or eliminates the need to stop a machine, and hence stop a working cell, to make frequent physical tooling/arm changes.

The embodiments remedy the disadvantages of the known art, while additionally providing compact size, good weight handling capacity, large gripping stroke, and configurable jaw shapes and configurations. The disclosure may provide these advantages in a compact servo-driven gripper that may not only handle the wafers and substrates discussed throughout the disclosure, but which additionally may handle solar cells, battery plates, fuel cell stack plates, and so on.

Although the disclosure is made largely by way of example with respect to a "dual wrist" robot with two theta flanges, i.e., a "stacked" set of arms to provide for higher throughput, the skilled artisan will appreciate, in light of the disclosure, that other types of end effectors may be used with the adjustable-arm end effector head disclosed herein. By way of non-limiting example, the disclosed embodiments may be used with the typical, single head end effector of the known art.

FIG. 1 illustrates a dual wrist semiconductor processing robot 10 having two stacked end effectors 12. The dual wrist robot 10 allows for the stacking of the two end effectors 12, one atop the other, such that each pair of arms 20 may be separately actuated. As such, twice as many retained elements may be processed by the illustrated system as are processed by a typical processing system. Of course, the skilled artisan will appreciate that the dual wrist system is shown only be way of example, and that the embodiments disclosed of the stacked, interleaved arms 20 may be employed in any known end effector system.

In the illustration, the arms 20 are typically swapped out by swapping out the base box module 22 in the entirety. That is, although the embodiment is shown with wider film frame arms 20, the illustrated end effector 12 may be used with other widths or depths of arms, but those arms are rigid and are interchanged only by stopping the process-run, removing the entire base box, inserting a new base box module 22 having different arms associated therewith, and restarting the system. The embodiments herein do not necessitate removal of the entire base box module, but instead simply allow arms to be variably moved to change the width therebetween.

Figure 2B:
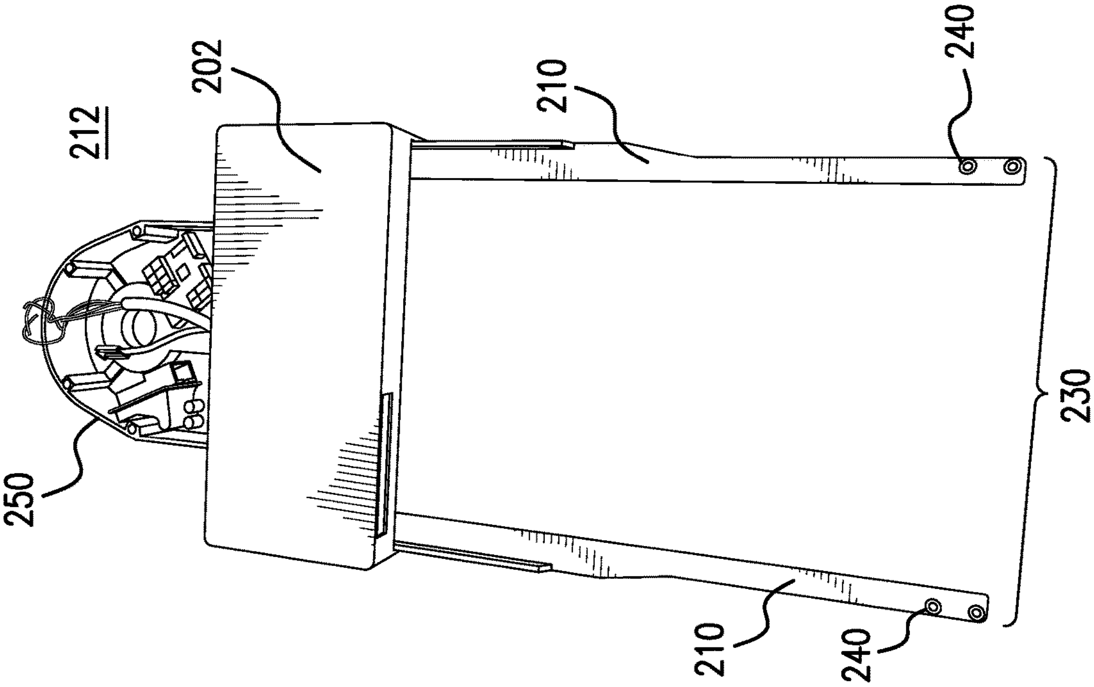
FIG. 2B is an illustration of aspects of a variable swath end effector.
Figure 2A:
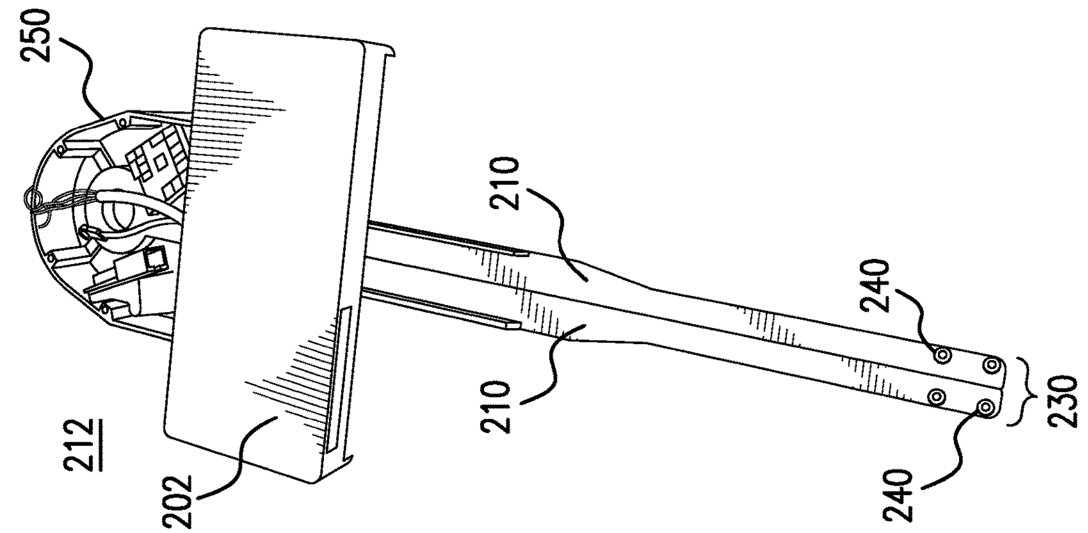
FIGS. 2A, is an illustration of aspects of a variable swath end effector.
Figure 2C:
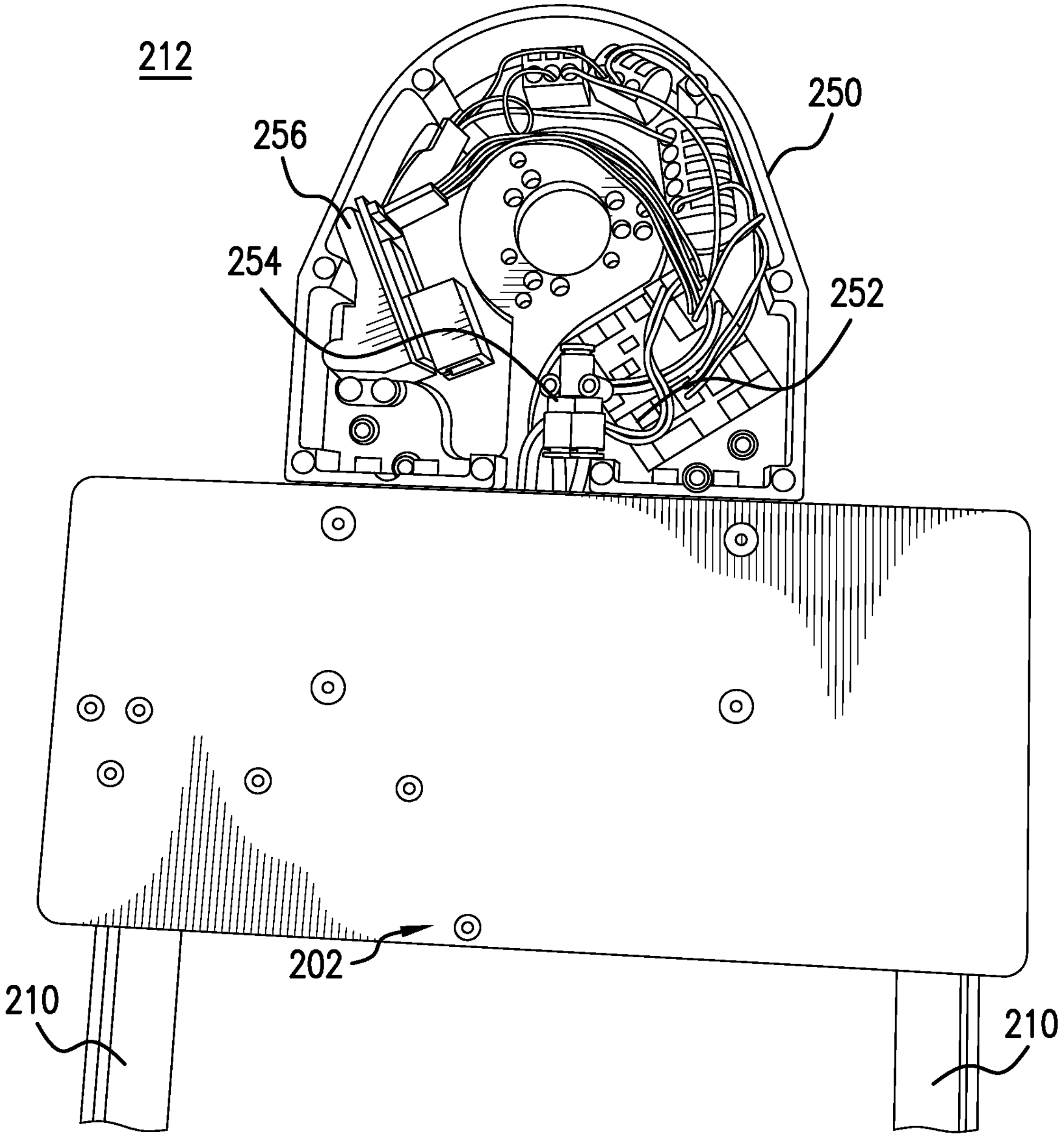
FIG. 2C is an illustration of aspects of a variable swath end effector.

FIGS. 2A, 2B and 2C illustrate actuation from main housing 202 to vary the swath between the arms 210 of an end effector 212. It will be appreciated that arm types can also be swapped in an out in the illustrated embodiment, and that the embodiment may be used with a single or dual wrist robot, i.e., the main housing 202 shown may have multiples thereof stacked, one atop the other, in a dual wrist embodiment. These multiple main housings may each have a pair of arms with a variable arm swath therebetween. Of course, in such an embodiment, overhead for the arms of each of the dual arm sets would be at a premium, particularly because two stacked arm pairs must be accommodated one atop the other.

In the illustration of FIGS. 2A and 2B, the arm swath 230 may vary between 50 mm to 200 mm, by way of non-limiting example. The arm swath 230 is shown closed in FIG. 2A, i.e., the arms 210 are substantially together, and the arms 210 are shown with a swath 230 of 190 mm therebetween in FIG. 2B. Of note, the arms 210 brought together to the maximum extent may create a paddle, dependent upon the shape of the arms, and such a paddle may be used to grasp small objects or wafers. The arms 210 extended apart is more suitable to accommodate larger wafers or items.

The arms 210 may include aspects to help grip objects/wafers associated therewith, and such retention aids 240 may or may not make use of an air or vacuum feed from the main housing, such as may pass through a port down each arm. Such retention aids 240 may include, but are not limited to, wedge clips, vacuum cups, and Bernoulli ports.

Controls and electronics may be included, at least in part, in the end effector back-end 250, as is more particularly illustrated in FIG. 2C. More particularly, the back end 250 may include aspects of the control system, such as a 4 axis programmable drive board with I/O 252; power and air/vacuum inputs/couplers 254; and a hub 256 for Ethernet/WiFi/Bluetooth communications, by way of non-limiting example. The latter may allow for each end effector 212, as well as each set of arms 210 associated with each end effector, to be uniquely assigned a network identification, such as a unique IP address on a network. This may greatly enhance off-board control capabilities, for example.

Correspondent to these capabilities provided at the back end 250, the capabilities may have mating elements in the main housing (which is sealed in FIG. 2). For example, power, control signals, air or vacuum, fiber optic lines, and so on may feed from the back-end 250 to the main housing 202, and may additionally feed through the main housing 202 to either or both arms 210. However, such feeds are not evident in FIGS. 2, as the main housing is sealed in these figures. Nevertheless, certain manual adjustments, such as a pitch adjustment, may reside on the outside of the main housing, as is also shown in FIG. 2C.

Figure 3A:
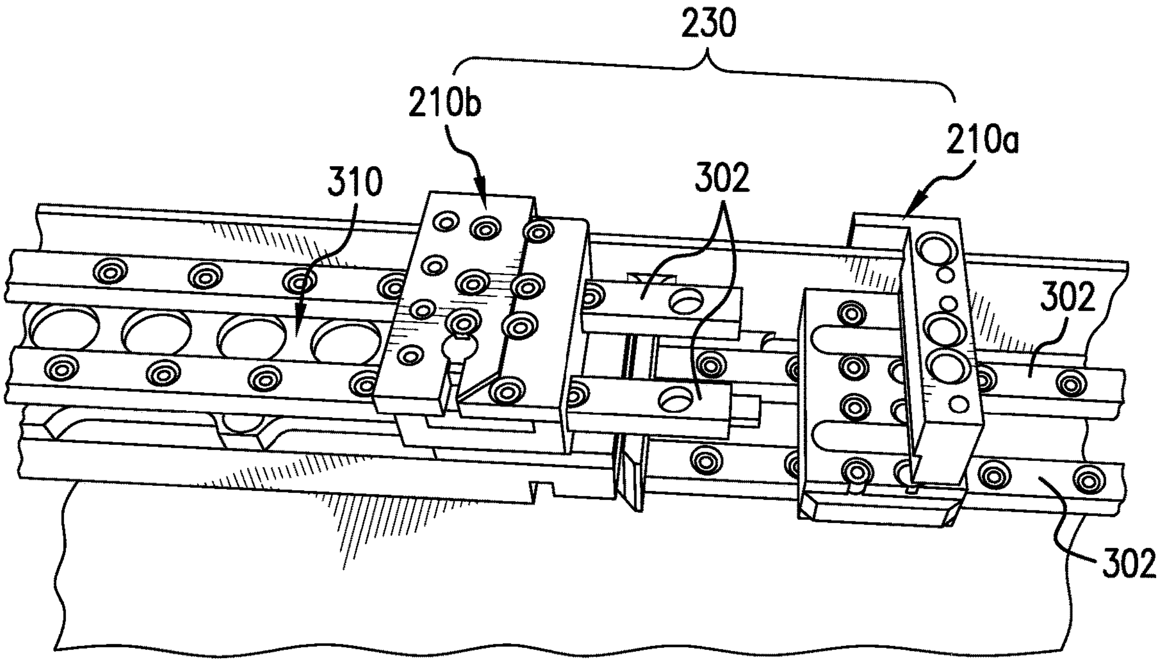
FIG. 3A is an illustrations of aspects of a variable swath end effector.
Figure 3B:
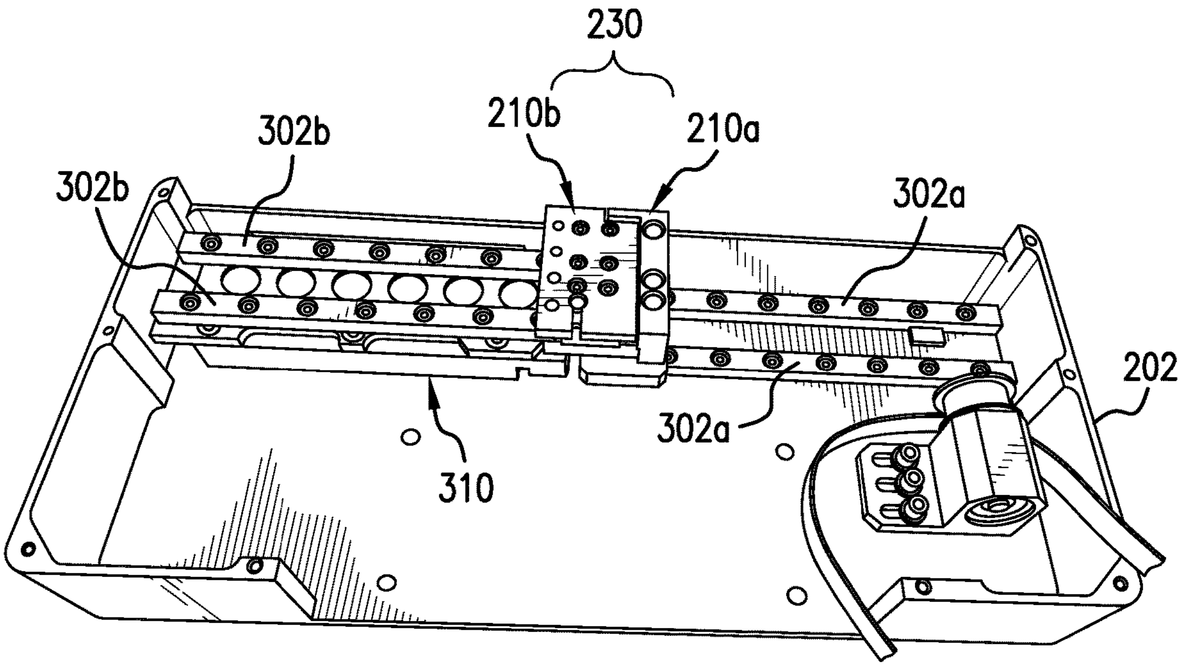
FIG. 3B is an illustration of aspects of a variable swath end effector.

FIGS. 3A and 3B illustrate the stacking and interleaving of dual bearing rails 302 for each of the right and left arms 210*a, b*. Although a single rail may be used for each arm in the embodiments, dual bearing rails 302 for each arms enhances the robustness, performance and durability of the disclosed embodiments.

As shown, the dual bearing rails 302 may be “stacked”, i.e., may be staggered as to height from a “floor” of the main housing, and may be “interleaved”, i.e., may at least partially overhang one another. The overhang rail distance may provide a savings of arm swath 230 versus overall width of the main housing 202, and additionally may reduce unit weight as well as spatial interference within each processing cell. For example, in the illustration of FIGS. 3, a 14 mm overhang is shown, although other ranges of overhang may be employed without departing from the disclosure.

By way of example, the left rails 302*b* are shown mounted to a raised subplate 310. This provides the referenced stacking. Moreover, the subplate 310 may provide a pitch adjustment for the left rails 302*b* (and hence for the left arm 210*b*). For example, the subplate 302*b* may be a “live hinge” that is adjustable from the outside of the main housing via one or more left pitch adjusters.

The full width of the main housing 202, particularly given the tight confines of a dual wrist end effector, may provide only about 25 mm of overhead per side. That is, only about 25 mm of lateral width of the main housing 202 may be available on each side of the main housing 202 after subtracting the maximum swath between the arms 210 when fully opened. Stacking and interleaving the bearing rails 302 of the arms optimizes spatial savings to maximum the use of this very limited overhead distance.

Figure 4:
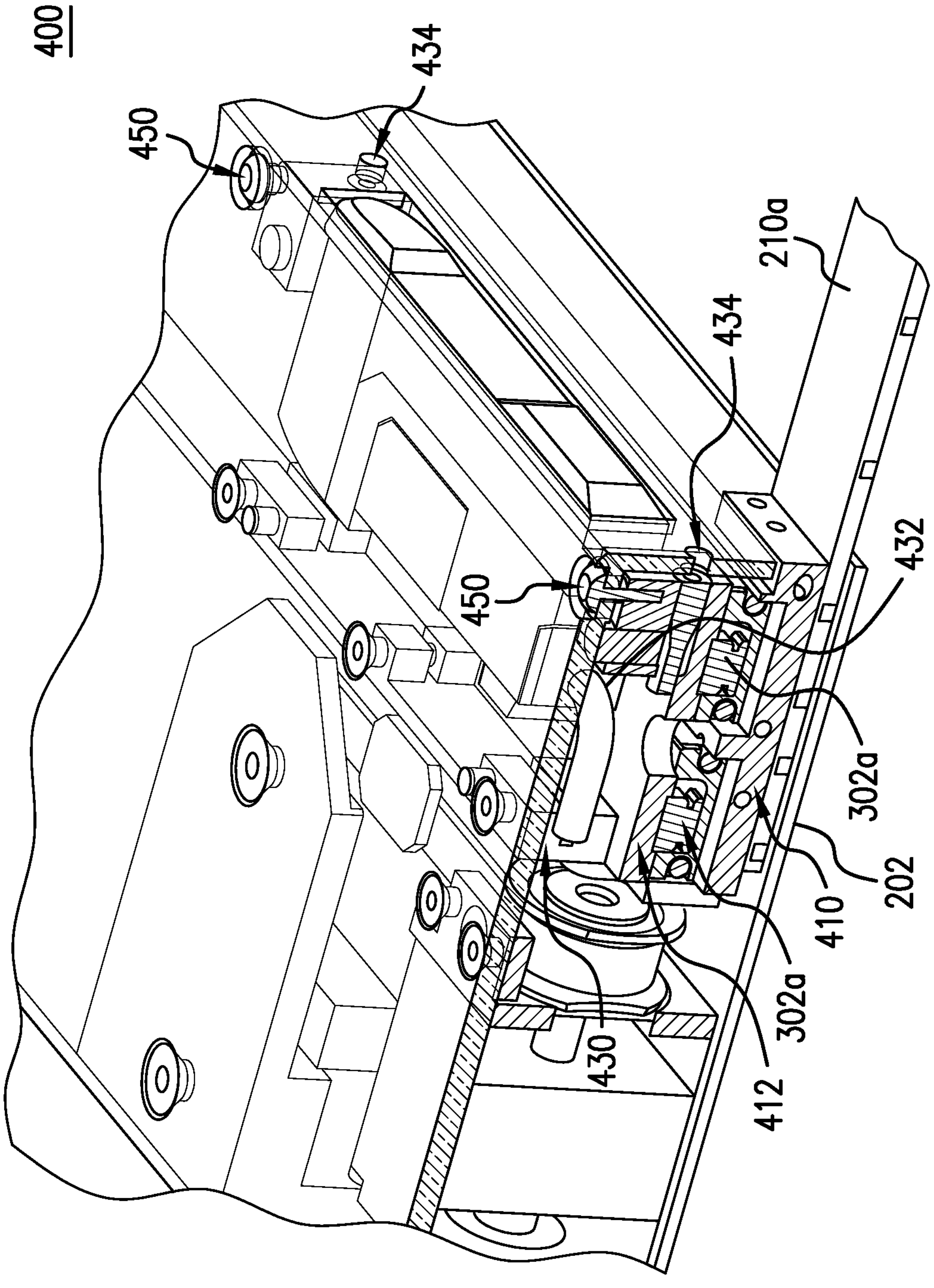
FIG. 4 is an illustration of aspects of a variable swath end effector.

FIG. 4 illustrates an independent arm pitch adjuster 400 on the left side of the main housing 202, capable of adjusting the pitch of the right side arm 210*b*. Shown are the right arm 210*a*, which may be supported by a supportive arm subplate 410; and the bearing rails 302*a* for the right arm 210*a*, which may receive pressure from a bearing plate 412 atop both of the dual right arm bearing arms 302*a*.

Additionally included in the pitch adjuster 400 is a live hinge support bar 430, which may flex in the vertical axis. A cylinder 432 is associated with a jack-screw 434 aligned with the outer ends of the live hinge support bar 430. This cylinder 432 provides the pitch adjustment. More specifically, as the jack-screw 434 is turned, the cylinder 432 extends at that end of the pitch adjuster, thereby moving the associated arm 210.

A tensioner screw 450 or screws may be provided to enable or disable the pitch adjustment 400. More particularly, the tensioner screw(s) 450 may be loosened to allow for a pitch adjustment, and may then be tightened to lock the respective arm 210 in place.

Figure 5:
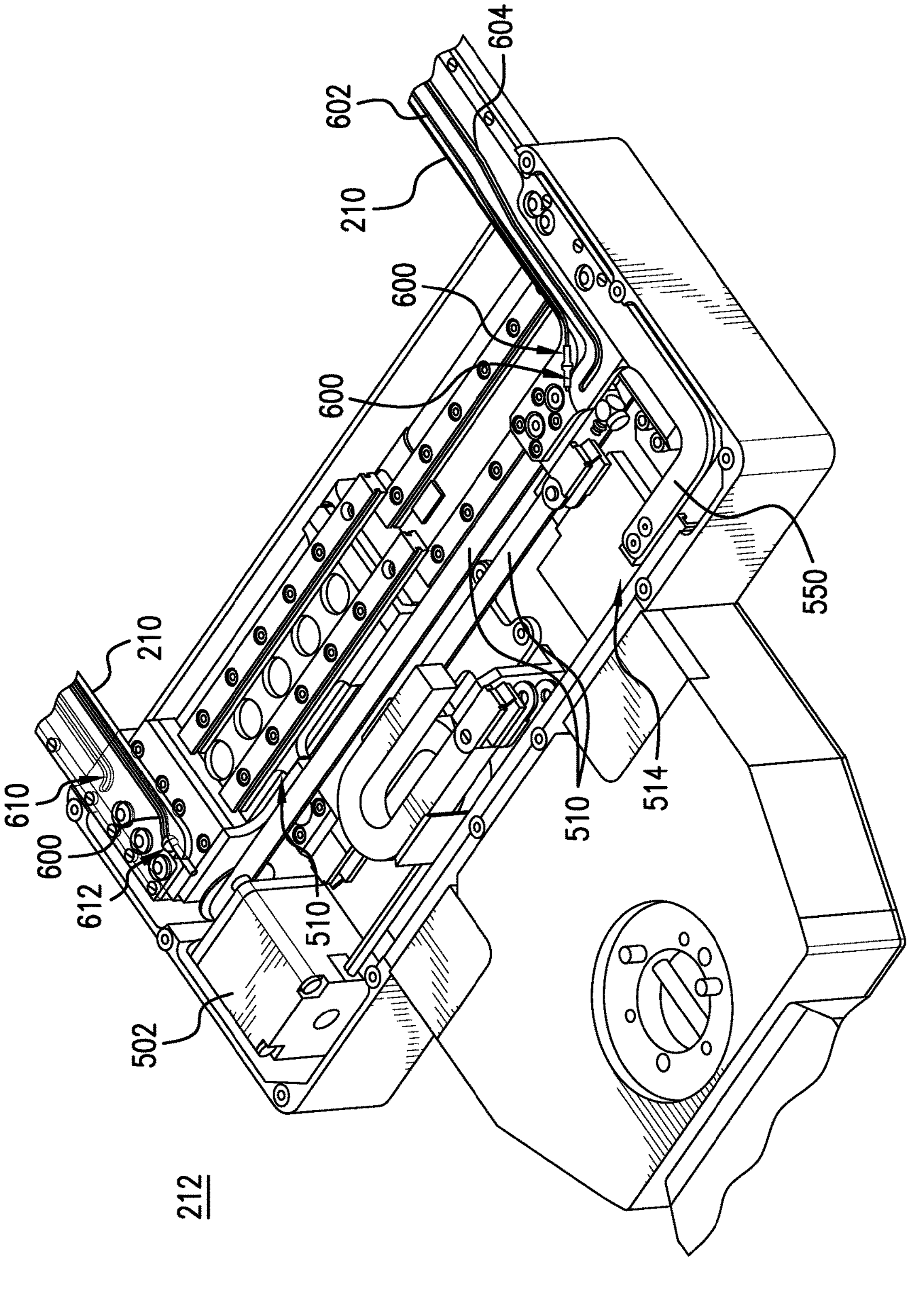
FIG. 5 is an illustration of aspects of a variable swath end effector.

FIG. 5 illustrates a bottom view of the variable width end effector 212, with the floor of the main housing 202 removed. As shown, the movement of the arms 210 may be motor 502, such as servo-motor, -driven, as discussed throughout. The arms 210 may be belt-driven by a drive belt 510 associated with the driving motor 502.

The arms may be stacked at multiple vertical levels within the base housing, wherein the arm movement is interleaved. The arm movement may be subjected to one or multiple levels of encoding 514, in order to allow for a refined positional assessment of the arms at all times. For example, FIG. 5 illustrates a potentiometer-style analog linear encoder 514, which may serve as an absolute positional encoder. Moreover, each arm 210 may be subject to encoding of its movement. By way of example, illustrated is a right arm encoder drive leg 550.

Encoders 514 may be additionally or alternatively be associated with the drive motor, the drive belt, the gearing about which the drive belt winds and/or that the motor drives, and/or with the arms themselves (as referenced above). The encoder(s) 514 may be absolute encoders, i.e., wherein every encoder position corresponds distinctively to a particular arm position, or may be incremental. By way of example, the encoder(s) may be resistance based.

As referenced throughout, various known features may be included on the disclosed arms, such as vacuum ports, Bernoulli cups, and fiber optic tip mapping. Accordingly, the supply lines 600 for these features may be provided through the base housing 202, and may be fed to the main housing as needed from the end effector back end. Such supply lines 600 may include fiber optics, power, air, or vacuum. These supply lines 600 may be flexibly provided in order to allow for movement of the connected arms.

Accordingly, FIG. 5 illustrates a flexible harness 600 supplying each of the arms 210. In the illustration, a pneumatic 602 and a fiber optic 604 supply is provided. As shown, the fiber optic supply 604 may terminate in a splice port 610, and the pneumatic line 602 may terminate in an o-ring port 612. Thereby, each arm 210 can be interchanged, and the arm-ports mated to the splice port 610 and the o-ring port 612 to respectively receive the fiber optic supply 604 and the pneumatic supply 602.

There is thus no limitation on arm movement or total arm-stroke in the embodiments, so long as the arm-stroke is less than the full confines of the width of the base housing. In short, arms may be readily interchanged for various purposes, with simple disconnect and reconnect of any fiber optics, pneumatics, etc., without any variation in the available arm stroke. Further, the arm stroke may (or may not) be fully decoupled from the arm pitch adjustment in the embodiments, at least because the two systems, i.e., pitch and arm stroke, may be fully discrete in the embodiments. As such, the embodiments provide remediation of the drawbacks in the prior art.

The foregoing apparatuses, systems and methods may also include the control of the various robotic and swath-varying functionality referenced throughout. Such control may include, by way of non-limiting example, manual control using one or more user interfaces, such as a controller, a keyboard, a mouse, a touch screen, or the like, to allow a user to input instructions for execution by software code associated with the robotics and with the systems discussed herein. Additionally, and as is well known to those skilled in the art, system control may also be fully automated, such as wherein manual user interaction only occurs to "set up" and program the referenced functionality, i.e., a user may only initially program or upload computing code to carry out the predetermined movements and operational sequences discussed throughout. In either a manual or automated embodiment, or in any combination thereof, the control may be programmed, for example, to relate the known positions of substrates, the robotics, the stationary point, and the relative positions there between, for example.

It will be appreciated that the herein described systems and methods may operate pursuant to and/or be controlled by any computing environment, and thus the computing environment employed not limit the implementation of the herein described systems and methods to computing environments having differing components and configurations. That is, the concepts described herein may be implemented in any of various computing environments using any of various components and configurations.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A variable swath end effector, comprising:

two arms, each for retaining a portion of a retained element;

two pairs of bearing rails, each pair being uniquely mechanically associated with a one of the two arms, wherein a level of one pair of bearing rails is staggered from a second level of the other pair of bearing rails in a perpendicular axis, and wherein the staggered pairs of bearing rails are interleaved with each other; and a motor capable of driving a belt in mechanical association with each of the two arms, wherein actuation of the motor drives the belt to synchronously move each of the two arms across a respective one of the pairs of bearing rails to vary the swath between the two arms, wherein the swath varies between about 50 mm and about 200 mm.

2. The variable swath end effector of claim 1, further comprising a main housing encompassing the two pairs of bearing rails, the motor, and the drive belt.

3. The variable swath end effector of claim 2, the main housing further comprising a feed through of a pneumatic line to each of the arms.

4. The variable swath end effector of claim 3, wherein a connection of the pneumatic line to each of the arms comprises a port.

5. The variable swath end effector of claim 4, wherein the port comprises an o-ring port.

6. The variable swath end effector of claim 3, wherein the pneumatic line feeds at least one vacuum port on each arm.

7. The variable swath end effector of claim 3, wherein the pneumatic line feeds at least one Bernoulli cup on each arm.

8. The variable swath end effector of claim 2, the main housing further comprising a feed through of an optical fiber line to each of the arms.

9. The variable swath end effector of claim 8, wherein a connection of the optical fiber line to each of the arms comprises a port.

10. The variable swath end effector of claim 9, wherein the port comprises a splice port.

11. The variable swath end effector of claim 1, further comprising a back end opposite the two arms.

12. The variable swath end effector of claim 11, wherein the back end comprises a network connection.

13. The variable swath end effector of claim 11, wherein the back end comprises a control board.

14. The variable swath end effector of claim 1, wherein the synchronous movement is encoded.

15. The variable swath end effector of claim 14, wherein the encoding is resistance-based.

16. The variable swath end effector of claim 14, wherein the encoding is absolute encoding.

17. The variable swath end effector of claim 1, further comprising a pitch adjustment to adjust the pitch of at least one of the two arms.

18. The variable swath end effector of claim 17, wherein the pitch adjustment comprises a cylinder driven by a jack screw.

19. The variable swath end effector of claim 1, wherein the motor is a servo-motor.

* * * * *